United States Patent [19]
Kendall

[11] 3,713,641
[45] Jan. 30, 1973

[54] DAMPING APPARATUS
[75] Inventor: Giles A. Kendall, Burbank, Calif.
[73] Assignee: Menasco Manufacturing Company, Burbank, Calif.
[22] Filed: Feb. 8, 1971
[21] Appl. No.: 113,516

[52] U.S. Cl. .................................. 267/139, 293/1
[51] Int. Cl. ......................................... F16f 3/10
[58] Field of Search ..267/139, 65; 123/90.48, 90.49, 123/90.59; 293/1

[56] References Cited

UNITED STATES PATENTS

| 3,307,883 | 3/1967 | Wustenhagen et al. | 267/65 R |
| 2,570,853 | 10/1951 | Pierce | 123/90.59 |
| 2,997,325 | 9/1961 | Peterson | 293/1 |

Primary Examiner—James B. Marbert
Attorney—Robert E. Geauque

[57] ABSTRACT

A damping apparatus composed of a relatively few number of parts wherein an orifice piston is movably mounted within a compressible solid chamber formed within a housing, the housing being crimped about an exteriorly serrated collar, the collar supporting a seal with the rod of the piston passing through the collar.

7 Claims, 3 Drawing Figures

PATENTED JAN 30 1973  3,713,641
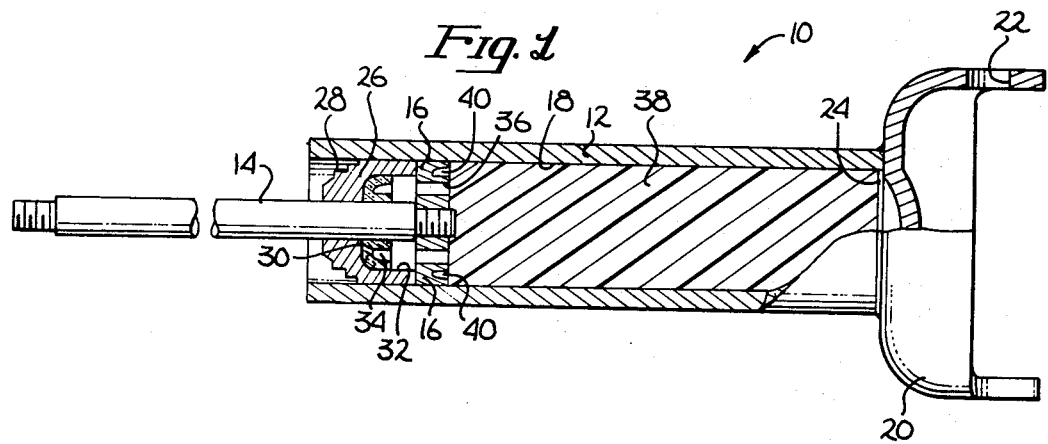
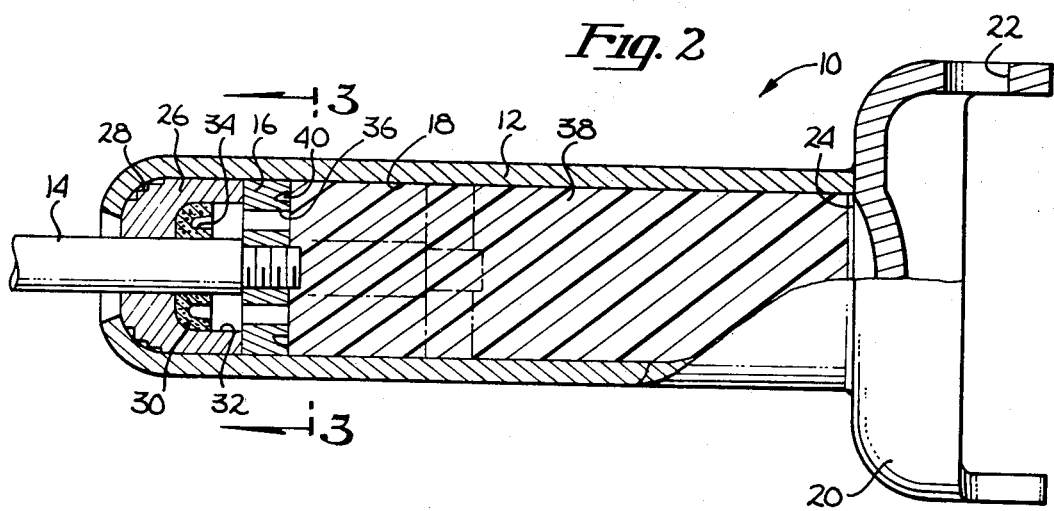
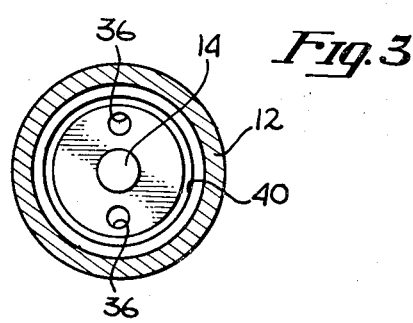
GILES A. KENDALL
INVENTOR.
BY R.E. Granger
ATTORNEY

DAMPING APPARATUS

BACKGROUND OF THE INVENTION

The field of this invention relates to dampers and more particularly to a damper for an automobile bumper which employs the use of a compressible solid material.

Automobiles have always employed some means to protect the body of the vehicle from slight bumps. Such means have normally been referred to as bumpers which are located at the front and rear portions of the vehicle. Such bumpers are normally formed of a rigid piece of material, such as steel, which is rigidly secured to the vehicle. Upon the vehicle being struck by another vehicle, or the vehicle striking a fixed object, the material of construction of the bumper normally fails upon incurring even a quite small impact force. Additionally, such bumpers normally directly transmit a force into the vehicle itself. Such transmission of force is undesirable as such causes further damage to the vehicle as well as increasing the possibility of damage to the occupants of the vehicle.

Within the past few years an effort has been made to design a bumper for a vehicle which would absorb force and not transmit any significant amount of force to the vehicle itself. It has been common to design such bumpers of a plastic or other similar material which, upon being deformed, will return to its original state. Further, such bumpers include therein a fluid which, upon being struck, the fluid is ejected through apertures within the bumper. The resistance to the ejecting of the fluid by the bumper effects an absorption of the force.

The major disadvantage of such fluid ejecting bumpers is that a relatively small amount of impact force will effect ejecting of the fluid from the bumper. Once the fluid has been lost, it is required that the bumper be refilled with fluid before it can be operated again. This means that for a period of time the bumper will be inoperative and also time is lost and expense is required to effect the refilling of the bumper.

It would be desirable to design an automobile bumper which has substantial force absorbing characteristics, which does not require any maintenance upon being struck by a relatively small amount of force, such bumper automatically returning to its initial state after contact.

SUMMARY OF THE INVENTION

The damping apparatus of this invention is designed to be employed to mount an automobile bumper with respect to the vehicle. However, it is to be understood that the present apparatus may be used in other environments, it only happens to be known that the environment of supporting an automobile bumper being most satisfactory. A piston rod is to be connected to the bumper with the piston rod terminating in a piston supported within a chamber formed within a housing. The housing is fixedly secured to the vehicle body. A compressible solid material is to be confined within the chamber formed within the housing. The piston is to be orificed so as to permit conducting from one side of the piston to the other side of the piston a portion of the compressible solid material. A collar surrounds a portion of the piston rod, the piston rod being slidably movable with respect to the collar. A seal is located between the collar and the piston rod in order to not permit leakage of the compressible solid material exteriorly of the chamber. The collar is exteriorly serrated and a portion of the housing is plastically deformed into contact with the serrations of the collar.

The primary feature of the damping apparatus of this invention is the construction of a damper which is composed of a relatively few number of parts compared to dampers of the prior art. Further, an additional feature is that the damping apparatus can be easily constructed in a minimum amount of manufacturing time. Another feature of the damping apparatus of this invention is that the damper may be constructed with a relatively minimum amount of skill being employed by the person or persons assembling the apparatus of this invention. Another feature of the apparatus of this invention is that the damper does not permit leakage of the compressible solid material exteriorly of the confined cylinder within the housing.

BRIEF DESCRIPTION OF THE DRAWING

FIG. 1 is a longitudinal cross-sectional view of the damping apparatus of this invention in an intermediate stage of manufacture;

FIG. 2 is a view similar to FIG. 1 but showing the damping apparatus in the final manufacturing stage; and FIG. 3 is a cross-sectional view taken along line 3—3 of FIG. 2.

DETAILED DESCRIPTION OF THE SHOWN EMBODIMENT

Referring particularly to the drawing, there is shown in FIG. 1 a damping apparatus 10 of this invention which is composed primarily of a housing 12 and a piston rod 14 connected to a piston 16. Piston 16 is movably mounted within a chamber 18 located within the housing 12. The housing 12 is fixedly secured to a mounting bracket 20. The mounting bracket 20 includes aligned apertures 22 which facilitate the securing of the bracket 20 to a fixed object such as the body portion of a vehicle. The piston rod 14 is to be fixedly secured to an object which is to be movable with respect to the body portion of the vehicle, such as the bumper of a vehicle (not shown).

The end of chamber 18 adjacent the mounting bracket 20 is closed off by means of a diaphragm 24. The diaphragm 24 is to comprise a metallic material and is to be welded to the housing 12.

Located within the free end of the chamber 18 is a collar 26. The piston rod 14 is to be slidably movable within the collar 26. The piston 16 is capable of coming into contact with the forward edge of collar 26. The periphery of the collar 26 is serrated into serrations 28. The serrations 28 are to facilitate securement of the collar 26 with respect to the housing 12. A seal 30, usually formed out of a molded nylon material, is to be located within an annular cavity 32 formed within the collar 26. The seal 30 is to surround and be in contact with the piston rod 14. It is to be noted that the seal 30 also includes an annular recess 34. The function of the recess 34 is that as the pressure of the material within the chamber 18 builds up, the seal 34 is pressed into tighter engagement with the piston rod 14, thereby insuring non-leakage of material from the chamber 18 past the piston rod 14. Such a recess within a seal is deemed to be conventional and need not be described herein detail.

The piston 16 includes a plurality of orifices 36 formed therethrough. It is envisioned that a compressible solid material 38 is to be located within the chamber 18. The size and number of the orifices 36 are selected in view of the type of material 38 so that as the material 38 passes through the orifices 36 from one side of the piston 16 to the other side of the piston, satisfactory damping will occur. However, the selection of orifice size and the number of such orifices 36 is to be considered a matter of choice or design.

Concentrically located within the piston rod 14 and formed within the operating face of the piston 16 is an annular recess 40. It is to be noted that the annular recess 40 is located adjacent the periphery of the piston 16. The function of the recess 40 is that as the pressure tends to build up within the chamber 18, that pressure tends to force outwardly the forward edge of the piston 16 into engagement with the wall of the chamber 18. As a result, leakage of the material about the periphery of the piston 16 is prevented and therefore must pass through the orifices 36, thereby achieving the desired damping characteristics.

It is also to be considered within the scope of this invention that instead of orifices 36 being employed, cutaway portions may be formed about the periphery of the piston 16. In other words, instead of material passing through orifices 36, it will pass through selected sized cut-away portions about the periphery of the piston 16. Such a modification is deemed to be within the scope of this invention.

To form the apparatus 10 of this invention is as follows: It is to be understood that one of the main advantages of the apparatus 10 of this invention is its small number of parts compared to similar devices of the prior art. All that is required to form the apparatus 10 of this invention is that the collar 26 which contains the seal 30, be slipped over the piston rod 14 and moved into contactual relationship with the piston 16. The piston 16 and the collar 26 are then slipped into chamber 18 within housing 12. It is to be understood that the housing 12 has previously been secured to mounting bracket 20 with the diaphragm 24 having been welded in place, closing off one end of the chamber 18. It is to be understood that prior to insertion of the piston 16 in the collar 26, the desired amount of compressible solid material 38 is inserted within the chamber 18. It is to be understood that the amount of material 38 inserted is to be such that normally no void will exist upon the piston 16 and the collar 26 being inserted within the chamber 18. Actually, it is normally desirable that a precompression of the material 38 be effected. This precompression can be accomplished by the plastic deformation of the housing 12 about the collar 26 which will now be described, thereby forcing the piston 16 into the compressible solid material 38, causing a precompression of the material.

With the collar 26 located just within the chamber 18 of the housing 12, a concentric force is applied by a tool, not shown, to dimple or deform the outer end of the housing 12 into a smaller diameter section. This plastic deformation of the housing 12 results in a securing of such to the collar 26. Normally, the force of the deformation is sufficient to create a small amount of precompression of the material 38 within the chamber 18. The serrations 28 facilitate the securing during this deforming operation of the collar 26 to the housing 12.

With the apparatus 10 of this invention having been formed, to effect the operation of such the procedure is as follows: The mounting bracket 20 facilitates the securing of the apparatus 10 to the body portion of a motor vehicle. At the free end of the piston rod 14 a bumper, not shown, is secured thereto. It is to be understood that normally two or more such apparatuses 10 will be employed for each bumper upon the motor vehicle. Upon the bumper being struck by sufficient force to effect a movement of the piston 16 within the chamber 18 of the apparatus 10, the compressible solid material 38 is caused to pass through the orifices 36 from one side of the piston to the other side of the piston 16. During this procedure a damping of such force occurs which does not permit the force to be transmitted directly at the maximum magnitude to the body of the vehicle. As the piston 16 moves within the chamber 18, a compressing of the material 38 occurs due to the addition of the volume of the piston rod 14 which moves within the chamber 18. Upon complete absorption of the force to which the bumper has been subjected, this additional compressive force within the material 38 creates an unbalance about the piston 16 which tends to return such to the position shown in FIG. 1 of the drawing, in other words, adjacent collar 26. Therefore, after absorption of the contact force by the apparatus 10, the bumper is returned to its initial position automatically.

It is envisioned that the material 38 will be what is termed a compressible solid material which is conventionally available from Dow Corning Corporation under the trade name of "Silastic." However, it is to be understood that the apparatus of this invention may be employed with other types of compressible solid material as well as non-compressible solid materials such as a fluid material.

The apparatus 10 of this invention is designed to absorb the amount of force which may be contacted in an automobile accident where the relative speed between the impacting objects is 15 to 20 miles per hour. If the impacting velocity exceeds this range, the piston 16 will be caused to abut the diaphragm 24, and therefore direct conductance of the impact force to the vehicle body results. However, even in instances of such larger impacting forces, a lessening of the damage to the vehicle occurs by the absorption of some of the energy initially. It is to be additionally understood that the size of the apparatuses 10 could be modified or the number of such apparatuses 10 could be modified so that the energy from larger impacting velocities could be absorbed. It is also to be understood that the apparatus 10 of this invention may be employed within other environments than on motor vehicles such as industrial machinery or the like where dampers are frequently employed. It is further to be noted that no specific material of construction need be employed for the apparatus 10 nor is it required that the apparatus need be designed with a high degree of tolerance. The reason for such is that it is estimated that the apparatus 10 will only be operated no more than half a dozen times during its entire life.

Therefore, because of the low numbers of cycles of anticipated use, rigorous requirements need not be met.

What is claimed as new in support of Letters Patent is:

1. A damping apparatus wherein the entire structure is formed of the following parts:
    a tubular housing having an internal chamber formed therein, said housing being closed at one end and open at the other end;
    means contained within said chamber being capable of absorbing energy, said means being under initial load;
    a piston movably supported within said chamber, said piston being formed to permit conductance of a portion of said means from one side of said piston to the opposite side;
    a piston rod being secured to said piston, said piston rod extending exteriorly of said housing through said open end;
    a collar located about said piston rod and within said housing, said piston rod being slidable with respect to said collar, said collar being secured to said housing, said collar having an exterior serrated surface, said open end of said housing being plastically deformed into contactual relationship with said serrated surface; and
    sealing means located between said collar and said piston rod to prevent leakage of said means exteriorly of said chamber past said piston rod.

2. Apparatus as defined in claim 1 wherein:
    said piston having an annular recess formed within the operating face of said piston, said annular recess being located adjacent the periphery of said piston.

3. Apparatus as defined within claim 2 wherein:
    said means comprises a compressible solid material.

4. A damping apparatus comprising:
    a tubular housing having an internal chamber formed therein, a compressible solid energy absorbing material located within said chamber, said material being under initial load;
    a piston movably supported within said chamber;
    a piston rod being secured to said piston, said piston rod extending exteriorly of said housing;
    a collar located about said piston rod and within said housing, said piston rod being slidable with respect to said collar; and
    said housing being plastically deformed into a secured relationship with said collar.

5. Apparatus as defined in claim 4 wherein:
    said collar having an exterior serrated surface, said surface being in abutting relationship with said housing.

6. Apparatus as defined in claim 5 wherein:
    said piston having at least one orifice formed therethrough for permitting passage of said compressible solid material from one side of said piston to the opposite side.

7. Apparatus as defined in claim 6 wherein:
    said piston having an annular recess formed within the operating face of said piston, said annular recess being located adjacent the periphery of said piston.

* * * * *